(12) United States Patent
Luu

(10) Patent No.: US 8,223,518 B2
(45) Date of Patent: Jul. 17, 2012

(54) MULTIPLE PHASE POWER SUPPLY HAVING CURRENT SHARED POWER FACTOR CORRECTION

(75) Inventor: Ky Thoai Luu, Victor, NY (US)

(73) Assignee: Harris Corporation, Melbourne, FL (US)

( * ) Notice: Subject to any disclaimer, the term of this patent is extended or adjusted under 35 U.S.C. 154(b) by 583 days.

(21) Appl. No.: 12/286,701

(22) Filed: Oct. 1, 2008

(65) Prior Publication Data

US 2010/0080029 A1    Apr. 1, 2010

(51) Int. Cl.
*H02M 7/08*    (2006.01)
*G05F 1/00*    (2006.01)

(52) U.S. Cl. ............................. 363/69; 363/70; 323/272

(58) Field of Classification Search ................. 363/65, 363/69, 70, 127; 307/70, 71; 323/268, 271, 323/272

See application file for complete search history.

(56) References Cited

U.S. PATENT DOCUMENTS

| 5,003,453 | A  |   | 3/1991 | Tighe et al. |       |
|-----------|----|---|--------|--------------|-------|
| 5,319,536 | A  | * | 6/1994 | Malik ........................ | 363/70 |
| 6,731,524 | B2 | * | 5/2004 | Elek et al. .................. | 363/70 |
| 7,170,197 | B2 | * | 1/2007 | Lopata ...................... | 307/70 |

FOREIGN PATENT DOCUMENTS

| EP | 0595091 A3 | 5/1994 |
| EP | 1220430 A1 | 7/2002 |

OTHER PUBLICATIONS

EP 09 01 2426, EP, European Search Report.

* cited by examiner

*Primary Examiner* — Jue Zhang
(74) *Attorney, Agent, or Firm* — Tarolli, Sundheim, Covell & Tummino LLP

(57) ABSTRACT

A multi-phase (N) power supply is presented having current shared power factor correction. This includes N input rectifier filters each receiving a respective different one of an N phase AC input signal and providing therefrom one of N rectified signals. N single phase power factor correction pre-regulators each receive a respective different one of the rectified signals and provide therefrom a regulated signal. A current sharing N way to single way multiplexing switch network receives the N regulated signals and provides therefrom a single output signal.

6 Claims, 2 Drawing Sheets

MULTIPLE PHASE POWER SUPPLY HAVING CURRENT SHARED POWER FACTOR CORRECTION

BACKGROUND OF THE INVENTION

1. Technical Field

The present invention is directed to the art of power supply systems and, more particularly, to improvements relating to multiple phase power line power supplies having current shared power factor correction.

2. Description of the Prior Art

Low power line disturbance power supply is becoming a preferred power supply for all new electronic circuits. A low power line disturbance power supply generates very small harmonic current feedbacks to the power grid.

The common technique that is employed today is called power factor correction (PFC), where a boost regulator (PFC pre-regulator) is used to pre-regulate the output voltage while forcing the input current to be sinusoidal and also in phase with the input line voltage. When the voltage and current are in phase, the power factor (PF) can be approaching unity and therefore, the real power is equal to the apparent power. This technique is called Active Power Factor Correction regulator, and the technique is only applicable to a single phase power line system.

To complete the power supply system, a high frequency DC/DC converter is added to provide a regulated DC output voltage to the load. See FIG. 1. A low power line disturbance power supply consists a front end power factor correction regulator followed by a switching voltage regulator.

As shown in FIG. 1, it is known in the prior art to employ a single phase system for an AC supply wherein an input rectifier filter 10 receives one phase of an AC signal and provides a rectified signal to a power factor correction pre-regulator circuit 12. This circuit pre-regulates the output voltage while forcing the input current to be sinusoidal and also to be in phase with the input line voltage. The output from regulator 12 is a regulated voltage which is applied to a high frequency DC-to-DC converter 14 which then supplies a regulated DC output voltage to a load 16.

As power requirement increases, a single phase power supply system is limited in its power output. A three phase power line system is necessary to handle higher output power.

In order to obtain a three phase power line disturbance power supply, three separate identical active power factor correction power supply systems are used and followed by a current sharing loop to balance current between these three power supplies. See FIG. 2. These three power supply systems are ORed together to form a single output sourcing current to a single load.

Reference is now made to FIG. 2 which shows a three phase AC input supplied to a circuit. This circuit includes three input rectifier filters 10A, 10B and 10C, each connected to receive one phase of the three phase AC input source. Each of these rectifier filters may take the form as the input rectifier filter 10 illustrated in FIG. 1. Each rectifier filter supplies a rectified signal to one of the pre-regulators 12A, 12B and 12C. Each of these regulators may take the form of the PFC pre-regulator 12 illustrated in FIG. 1.

The output signals from the pre-regulators are supplied to DC-to-DC converters 14A, 14B and 14C. Each of these converters may take the form of the converter 14 in FIG. 1. These converters feed a common current sharing circuit 15 and are ORed together to provide a single output sourcing current to a load 16. It is to be noted that the current sharing circuit supplies current sharing feedback to the converters in the manner illustrated in FIG. 2. This is a control loop that operates at a slow speed to ensure that the current from each power supply system is shared equally. Each DC-to-DC converter is used to provide one-third of the total output current. The feedback loop is prone to oscillation and the current sharing between each power supply is, therefore, unbalanced. This drive is required for a larger output power capability and additional system cost.

SUMMARY OF THE INVENTION

In accordance with one aspect of the present invention, a multi-phase (N) power supply is provided having current shared power factor correction. This supply includes N input rectifier filters, each receiving a respective different one of an N phase AC input signal, and providing therefrom one of N rectified signals. N single phase power factor correction pre-regulators are provided with each serving to receive a respective different one of the rectified signals and providing therefrom a regulated signal. A current sharing N way to single way multiplexing switch network receives the N regulated signals and provides therefrom a single output signal.

In accordance with a more limited aspect of the present invention, a single DC-to-DC converter is provided that receives the single output signal and supplies therefrom a DC output signal to a load.

Still further in accordance with a more limited aspect of the present invention, N=3.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE PREFERRED EMBODIMENT OF THE INVENTION

Figure 1:
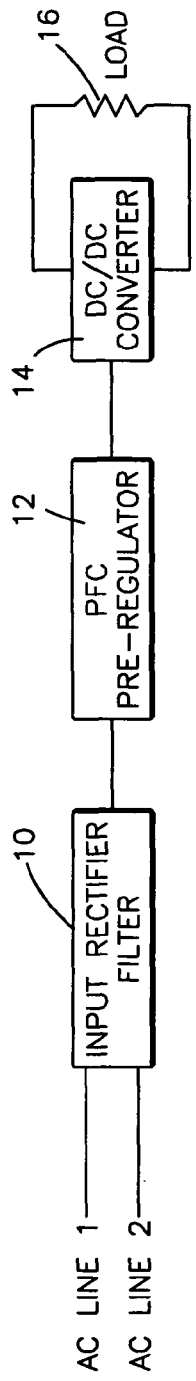
FIG. 1 is a block diagram illustration of a prior art single phase power line-load power line disturbance power supply circuit.
Figure 2:
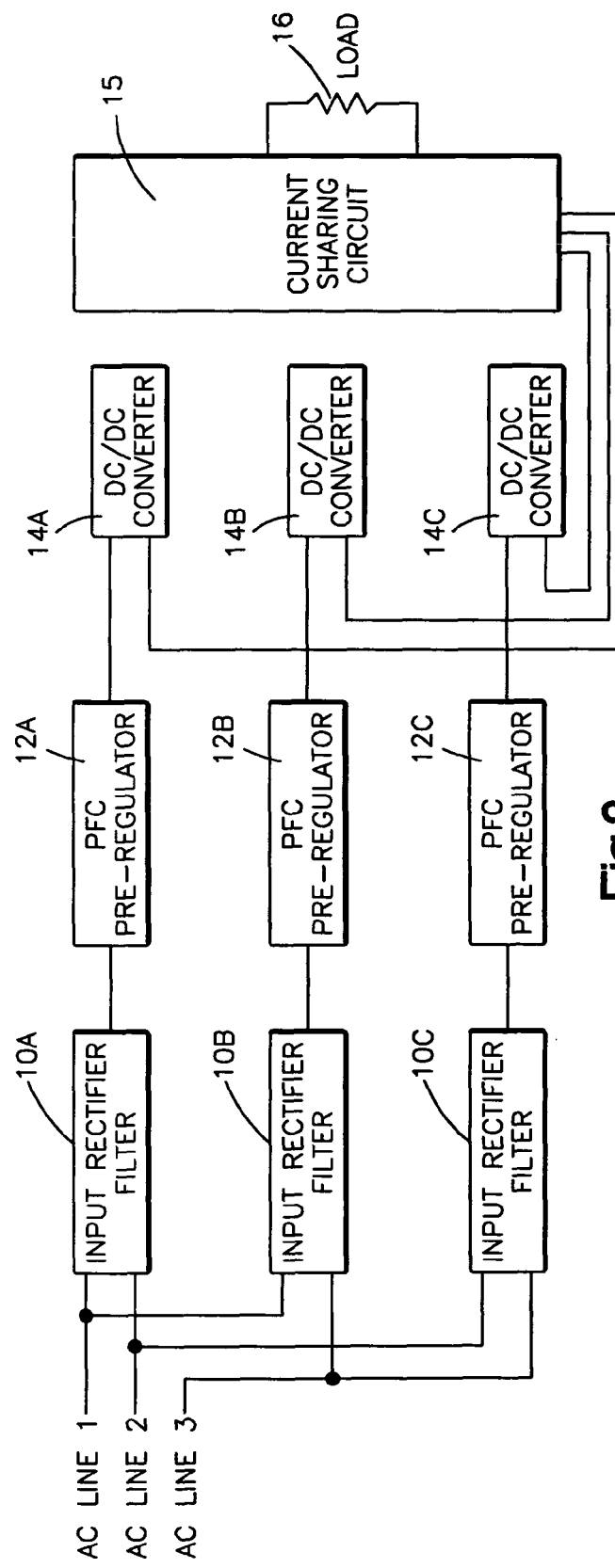
FIG. 2 is a block diagram illustration of a three-phase power line disturbance power supply circuit.

In the above description relative to FIGS. 1 and 2, a discussion was had of the prior art respecting the use of multiple DC-to-DC converters, along with a current sharing circuit, for supplying current to a load from a three phase AC input. In accordance with the present invention as will be described below relative to the embodiment presented in FIGS. 3 and 4, the invention is presented with a true current sharing circuit employing a three-to-one multiplexing switch in the embodiment presented in conjunction with three single-phase power factor pre-regulators which will balance the supply current from each single phase power factor pre-regulator. The single phase power factor pre-regulator, in itself, is a well known technology.

Figure 3:
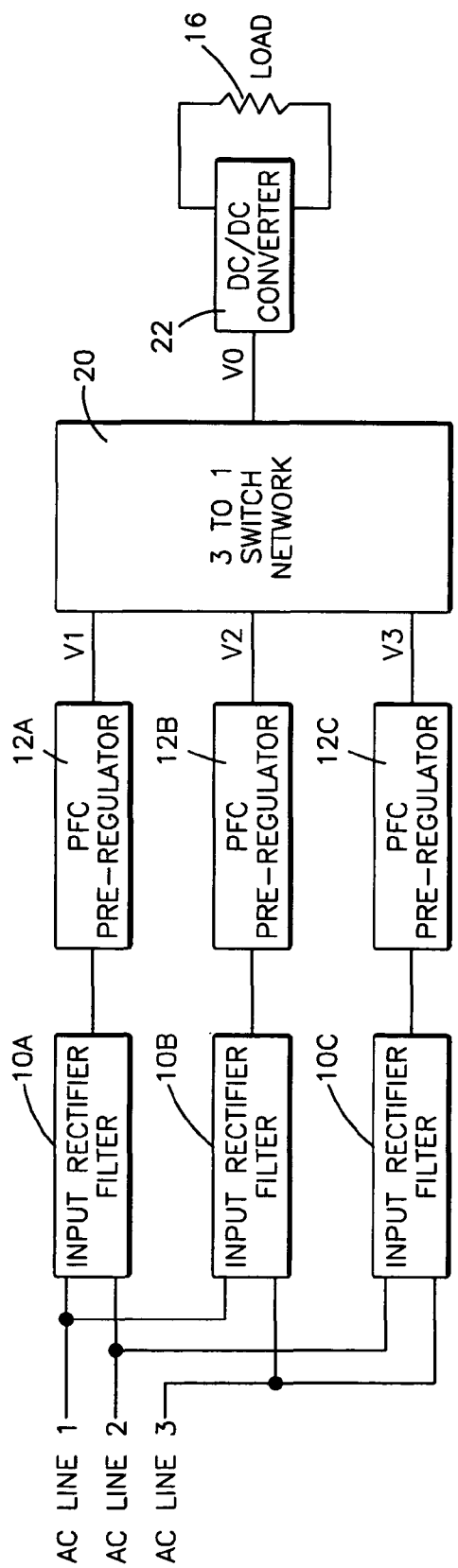
FIG. 3 is a circuit in accordance with the present invention for a three-phase power supply having true current shared power factor correction.

As presented in FIG. 3, this embodiment of the invention, like that in FIG. 2 of the prior art, employs three rectifier filters, 10A, 10B and 10C. Additionally, as in the prior art of FIG. 2, this embodiment employs three PFC pre-regulators 12A, 12B and 12C, respectively providing, DC voltages $V_1$, $V_2$ and $V_3$ to a three-to-one switch network 20, which supplies a DC output voltage VO to a single DC-to-DC converter 22 that supplies the load 16.

It is to be noted that this embodiment of the invention employs only a single DC-to-DC converter 22 instead of the prior art technique as illustrated in FIG. 2 that requires three separate DC-to-DC converters. The advantage of a single converter is that there is no requirement of output current sharing circuit and a feedback control loop.

Figure 4:
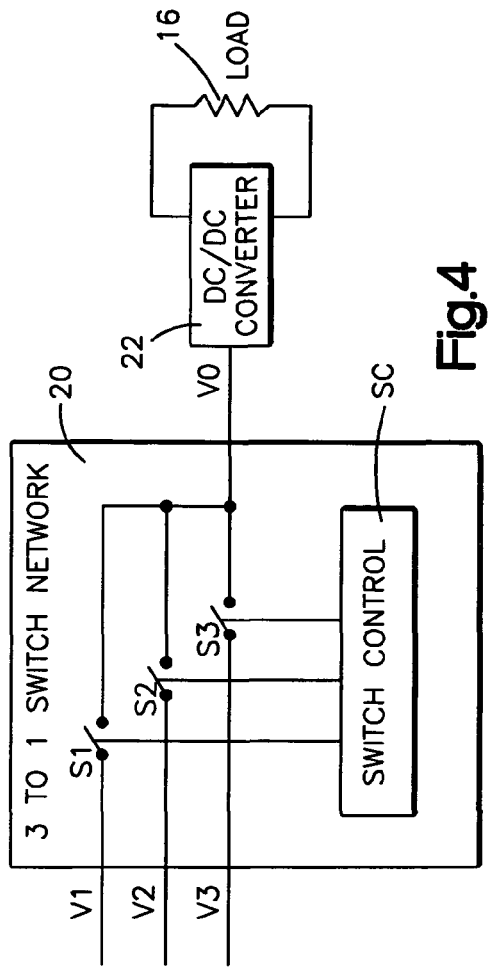
FIG. 4 is a schematic-block diagram illustration of the three-to-one voltage switching network shown in FIG. 3.

Reference is now made to FIG. 4, which illustrates a three-to-one switch network 20 in greater detail than that shown in FIG. 3. The DC voltages $V_1$, $V_2$ and $V_3$ are supplied to the switch network which provides a single output voltage VO to the DC-to-DC converter 22, which then feeds the load 16. This network includes switches S1, S2 and S3, which take the form of a high speed, high current transistors. They may be implemented in various ways, such as by using MOSFET, BIPOLAR transistors, IGBT and other switching devices. In this embodiment, the three-to-one switch network is comprised of three high speed switches. Only one switch will be turned on at a time and it connects one of the input voltages $V_1$, $V_2$ or $V_3$ to be the output voltage VO and which is applied to the input of the single DC-to-DC converter 22. A switch control SC is employed for controlling the operation of the switches S1, S2 and S3 so they are switched in sequence at a one-third duty cycle each. Therefore, each power factor corrector supply will source a common DC-to-DC converter at 33.3% duty cycle and repeat continuously. This technique allows a true current sharing between these three power factor pre-regulators without the use of an output current sharing feedback network, as in the case of the prior art of FIG. 2. There is only one DC-to-DC converter employed, instead of the prior art technique of the three DC-to-DC converters. This is a duty cycle control technique and it eliminates complex and unstable feedback network.

SUMMATION

As presented herein, the invention is directed to a multi-phase power supply that has current shared power factor correction. This supply includes a plurality of input rectifier filters with each receiving a respective different one of the multi-phase AC input signal and providing therefrom a single rectified signal. A single phase power factor correction pre-regulator receives a respective one of the rectified signals and provides therefrom a rectified regulated signal. A current sharing N way to single way multiplexing switch network receives the regulated signals and provides therefrom a single output signal.

It will be understood that the above description of the present invention is susceptible to various modifications, changes and adaptations and the same are intended to be comprehended within the meaning and range of equivalence of the appended claims.

Having described the invention, I claim:

1. A multi-phase (N) power supply having current shared power factor correction, comprising:

N input rectifier filters each receiving a respective different one of an N phase AC input signal and providing therefrom one of N rectified signals;

N single phase power factor correction pre-regulators each for receiving a respective different one of said rectified signals and providing therefrom a regulated signal;

a current sharing N way to single way multiplexing switch network for receiving said N regulated signals and providing therefrom a single output signal, wherein the single output signal is one of the regulated signals from the N single phase power correction pre-regulators;

a DC to DC converter for receiving said single output signal and supplying a DC output signal to a load; and a switch control for controlling a plurality of switches comprising the current sharing N way to single way multiplexing switch network in a continuously repeated sequence such that each single phase power factor correction pre-regulator sources the DC-to-DC converter at a duty cycle of 1/N during a given sequence.

2. A multi-phase power supply as set forth in claim 1 wherein N is equal to three and said switch control turns said three switches on in a sequence at a one-third duty cycle each.

3. A multi-phase power supply as set forth in claim 2 wherein each of said three switches is a high speed, high current transistor switch.

4. The multi-phase power supply of claim 1, wherein the current sharing N way to single way multiplexing switch network comprises N high speed, high current transistor switches.

5. A three-phase power supply having current shared power factor correction, comprising:

three input rectifier filters each receiving a respective different phase of said supply and providing therefrom a rectified signal;

three single phase power factor correction pre-regulators each for receiving a respective different one of said rectified signals and providing therefrom a regulated signal; and a current sharing three way to single way multiplexing switch network for receiving said regulated signals and providing therefrom a single output signal, wherein the single output signal is one of the regulated signals from the three single phase power correction pre-regulators;

a DC to DC converter for receiving said single output signal and supplying a DC output signal to a load; and a switch control for controlling a plurality of switches comprising the current sharing three way to single way multiplexing switch network in a continuously repeated sequence such that each single phase power factor correction pre-regulator sources the DC-to-DC converter at a duty cycle of one-third during a given sequence.

6. The three-phase power supply of claim 5, wherein the a current sharing three way to single way multiplexing switch network comprises three high speed, high current transistor switches.

* * * * *